United States Patent [19]

Schoppe

[11] 4,201,541
[45] May 6, 1980

[54] PROCESS AND INSTALLATION FOR THE PRODUCTION OF CALCINED MATERIAL

[76] Inventor: Fritz Schoppe, 8026 Ebenhausen, Isartal Max-Ruttger-Str. 24, Munich, Fed. Rep. of Germany

[21] Appl. No.: 860,186

[22] Filed: Dec. 13, 1977

Related U.S. Application Data

[63] Continuation-in-part of Ser. No. 475,874, Jun. 3, 1974, Pat. No. 4,098,871.

[30] Foreign Application Priority Data

Dec. 16, 1976 [DE] Fed. Rep. of Germany ....... 2657135

[51] Int. Cl.$^2$ ............................................. F27B 15/00
[52] U.S. Cl. .................................... 432/58; 432/106; 34/57 E
[58] Field of Search ..................... 432/58, 15, 14, 106; 106/100; 34/57 A, 57 E

[56] References Cited

U.S. PATENT DOCUMENTS

| | | | |
|---|---|---|---|
| 2,650,084 | 8/1953 | White | 423/177 |
| 3,140,862 | 7/1964 | Schoppe | 432/58 |
| 3,452,968 | 7/1969 | Shimizu et al. | 432/106 |
| 3,495,949 | 2/1970 | Niedner et al. | 34/57 E |
| 3,843,314 | 10/1974 | Ishikawa | 432/58 |
| 3,869,248 | 3/1975 | Hirai et al. | 432/58 |
| 3,881,861 | 5/1975 | Ritzmann | 432/14 |
| 3,881,862 | 5/1975 | Nishida et al. | 432/14 |
| 3,891,383 | 6/1975 | Kobayashi | 432/106 |
| 3,914,098 | 10/1975 | Kano et al. | 432/58 |
| 3,947,238 | 3/1976 | Fukuda et al. | 432/14 |

Primary Examiner—Henry C. Yuen
Attorney, Agent, or Firm—Le Blanc, Nolan, Shur & Nies

[57] ABSTRACT

A process and installation for the production of powdered, surface-active, agglomeratable, calcined material, specifically calcined lime, from a material or raw material present in the form of sludge, scum or the like such as the waste materials in the sugar industry. One specific example of the process is production of calcined lime and/or usable $CO_2$ from waste materials existing in the sugar producing industry. The installation in which the process is carried out includes a special calcining or reaction chamber which provides parallel flow paths with a turbulent vortex zone within which the raw materials are subjected for controlled periods to desired reaction temperatures.

19 Claims, 7 Drawing Figures

PROCESS AND INSTALLATION FOR THE PRODUCTION OF CALCINED MATERIAL

This application is a continuation-in-part of application No. 475,874 filed June 3, 1974, (now U.S. Pat. No. 4,098,871).

The present invention relates to novel, improved methods and apparatus for producing particulate, surface active, calcined materials.

One particularly important application of the invention at the present time is in the production of surface active, calcined lime from sludges generated in sugar-making processes; and the principles of the present invention will accordingly be developed primarily by reference to that application. It is to be understood, however, that this is for the purposes of simplicity and clarity and is not intended to limit the scope of protection to which I consider myself entitled.

As is known, in the production of sugar a sludge is produced which, in addition to lime ($CaCO_3$), sucrose and albumen, contains small quantities of other constituents and has a varying moisture content. Previously, this lime sludge has often been used as a fertilizer; in recent years it has usually been simply deposited somewhere, which involves more or less considerable expense. This also is not desirable from the point of view of avoiding pollution of the countryside and general environment.

Various attempts have already been made for recovering lime from line containing sludge in sugar production works by burning.

For example in the United States of America, some time ago a plant was built with a multi-tier furnace comprising eleven tiers or stages and fired with additional fuel. This plant, however, could achieve only a yield of 65% since, because of the way the plant operated, a considerable proportion of the lime was carried away by the discharged gases. Preventing this would have required an expensive installation for extracting dust from the waste gases. According to reports, the operating behaviour of the said plant is not satisfactory.

Again in the United States of America it has already been attempted to calcine lime sludge with a very long and complicated shape rotary tubular furnace. This kind of apparatus can in fact obtain better operating results than that previously mentioned, but the rotary tubular furnace itself and also its operation is so expensive as to prevent its being used in sugar factories even for reasons of cost alone. Furthermore, the furnace does not operate in a troublefree manner, so that there are frequent interruptions in working, more particularly owing to material caking-on in the form of rings in certain zones of the furnace. But with a furnace length of more than 90m these accumulations can be removed only if the furnace is stopped and cooled, and this takes several days.

Still other, comparable prior art methods for recovering lime from sludges are disclosed in U.S. Pat. No. 2,650,084 issued Aug. 25, 1953, to White; and No. 3,796,791 issued Mar. 12, 1974, to Nielson et al.

A primary object of the present invention resides in the provision of a unique process for the production of a powdered, surface active, agglomeratable, calcined material from a raw material using combustion gases and exhaust gases to preheat and react the raw materials under temperature and time controlled reacting conditions.

A further object resides in isolating the produced powder from reaction gases produced during the reaction.

The invention has a more particular object to make a sensible use of the waste product produced in sugar production, e.g., the lime-containing sludge, and to develop for this purpose a rational process which consists substantially in preparing the lime-containing sludge, using the calorific value of its organic impurities, to obtain CaO again as far as possible, which can then be re-used in sugar production in a particularly simple and economical manner.

In sugar production, lime milk is required and for this purpose the CaO is hydrated and dissolved in water. Therefore, a further object is to produce the CaO in such a form that it is capable of being hydrated and dissolved in water in an easy and rapid a manner as possible. This can be achieved by so controlling the process for the production of CaO that a highly active CaO powder is obtained which reacts chemically and physically very quickly.

Behind the aforesaid objects of the invention there is also the objective of providing a method which enables the construction of and use of novel installations involving low constructional outlay and having high operating flexibility. Apparatus expense is very important more particularly in sugar production since, as is known, sugar producing apparatus are in use only for three to four months in the year, so that the construction outlay, that is to say investment and other capital costs, have about three to four times as much weight as in other branches of industry where the plant can be used uniformly over the entire year.

The flexibility of the process, i.e. the possibility of adapting it to various operating conditions, is important since on the one hand the organic constituents in the lime sludge fluctuate considerably, so that different quantities of heat are produced which have to be compensated for, and on the other hand the installation in question must be capable, for example at the beginning of a sugar campaign or under other operating conditions, of dealing if appropriate with even pure $CaCO_3$ and sugar lime sludge.

To solve the aforesaid problems and to obviate the disadvantages of known processes and installations or apparatus for the recovery of lime from lime-containing waste sludges for example in the sugar industry or the like, according to the invention it is proposed to use a process wherein, in detail, the following procedure is used: preheated and predried lime-containing sludge and preheated combustion air and, if necessary, additional fuel are introduced into a chamber and mixed thoroughly with one another, and the combustible constituents are burned. These materials flow through the chamber at least partly in an upward direction from below, the lime particles being subjected to a heat treatment during which they are kept in a state of suspension. Here it is an important objective of this invention that the lime particles are heated as quickly as possible, and in fact with a speed of heating which is above about 400° C. sec.; the upwardly directed flow of the air stream carrying the particles has such a speed that the average time of residence of the lime particles in the combustion and reaction zone in the chamber amounts to less than one second.

The thoroughly desirable effect is obtained that the time of residence of smaller particles in the combustion and reaction zone is shorter and the period of residence of the large particles is somewhat longer, so that on the one hand a complete calcining of the lime particles is achieved and on the other hand over-heating is avoided. Those particles which are too large or too heavy to be carried in the air flow fall downwards and are collected there and removed. These conditions can be controlled in a simple manner by selecting the speed of the combustion air flow passing upwards in the chamber. The consequence of this is again a very uniform calcining of all lime particles. But in addition, with a view of maintaining the desired temperature in the heat treatment chamber, it is necessary to control introduction of the additional fuel in such a manner that on the one hand no overheating occurs and on the other hand no inadequate temperatures occur. This means that owing to the usually fluctuating calorific value of the combustible substances in the lime sludge the introduction of any additional fuel which may be necessary is to be regulated in accordance with the calorific value of the sludge. A further feature of this process consists in that the air ratio relative to the theoretical quantity of combustion air is between about 1.4 and about 2.5, but preferably between about 1.6 and about 2.0; this means in practice that the quantity of combustion air is regulated so as to maintain the aforesaid air ratio. By means of all the measures described hereinbefore the result is achieved that the CaO particles, independently of the size of the particles, are heated approximately all to the same predetermined combustion temperature which is kept approximately constant, and are heated in a very short time.

If the lime-containing sludge is treated in the aforesaid manner there is obtained a graded, surface-active lime powder of specific particle size, which is carried by a gas flow from which the powder has then to be separated and precipitated. But this is possible in an economical manner with a relatively small outlay on apparatus only if the powder particles carried by the gas flow have a sufficiently high surface activity, since in that case they agglomerate to form secondary particles and in this way allow easy separation from the exhaust gas. If there were no activation of the dust particles and thus no formation of secondary particles, the extraction of powder from the outgoing gases would be so expensive as to prejudice the economic aspect of the process.

It is an additional object of the present invention to minimize the excess air employed in the combustion process and thereby increase the efficiency of the calcining operation. This can be accomplished by connecting the upper, outlet end of the reaction chamber through an annular slot extending around the periphery of the chamber to a toroidal chamber surrounding the reaction chamber in tangential flow relationship to the slot. By virtue of this arrangement, air which would otherwise stagnate in a layer adjacent the reaction chamber walls and therefore not enter into the calcining process is caused to flow into the toroidal chamber and mix with other gases from the reaction chamber and the material being processed in a final stage of the calcining operation.

Still another object of the present invention is control over physical characteristics of the calcined particles such as hardness and abrasiveness. This can be gained by introducing fuel in controlled amounts into both the upper and lower ends of the reaction chamber.

As a further object, commensurate with the foregoing, in order to prevent any danger of recombination when cooling the finished product in the presence of $CO_2$-containing exhaust gases, it is advantageous in the region of the separating zone to use an air flow to shield the separated hot CaO from the exhaust gas and to mix it with an air flow whereby it is transported further. By means of the air flow the exhaust gas containing $CO_2$ is substantially displaced and separated from the lime dust in such a manner that there is no longer any risk of recombination.

It may also be advantageous to take the air flow from the quantity of air preheated in the heat exchangers, since in this way a very hot mixture of CaO and air is obtained which allows substantial preheating of the combustion air to about 600° C. in a heat exchanger, whereby the consumption of fuel can be correspondingly reduced.

The objects aimed at by the invention could not be achieved if the burning process for obtaining CaO using the calorific value of the combustible constituents, more particularly the organic impurities of the sugar sludge, resulted in burning temperatures at which the CaO is over-heated or "dead burned". Therefore, it is particularly important and, in the exemplary process according to the present invention, possible in a relatively simple manner to conduct the calcining process for recovering CaO in such a manner that the organic constituents are completely burned, but over-heating and thus inadequate physical or chemical activity of the CaO are reliably obviated.

An important side object of the process according to the invention results from the production of $CO_2$ which results from the burning of the organic constituents of the sludge or the additional fuel, and which is required in any case for the sugar production and thus can be economically used.

For the best possible economic conditions, raw material, i.e., the lime sludge before introduction into the chamber is preheated by means of exhaust gas heat to a temperature of about 400° C. to 800° C., preferably over 500° C. to 600° C. The combustion air is also preheated in an appropriate manner, and preferably to a temperature which is above the calcining temperature.

The sludge is conveniently blown into the heat treatment chamber (calcining chamber) and for this purpose it is advantageous to use a portion of the exhaust gas flow.

If in a sugar production works in which an installation for carrying out the process according to the invention as described hereinbefore is installed, at the beginning of a campaign no lime-containing sludge has been yet obtained from sugar production, or only an inadequate amount, or outside the campaign it is desired to produce burnt lime, the installation can be used without further modifications for the production of the required CaO by using as the starting material additionally to the sludge present or instead of the sludge, finely ground limestone which is then subjected in the same manner as mentioned to a calcining treatment in order to obtain the desired CaO. If necessary, other calcinable materials with a suitable reaction may also be treated in a similar manner. From this there follows the possibility of using the installation in question also for the production of other graded, surface-active powders for obtaining in an advantageous rational manner suitable high-quality inorganic products.

The calcining plants used in sugar manufacture are in operation for only about three months of each year; and it takes several days for the carbonatation sludge to reach its final quantity and composition. This means that the plant must be able to process amounts of sludge which gradually increase from small quantities to full capacity with equal efficiency.

Added to this, stoppages of production can never be completely ruled out in the sugar-producing industry; and these may last several hours. During this time the carbonatation sludge, which remains fluid only when in motion, can solidify in and immediately clog the conduits through which it flows. This requires that the conduits be dismantled and flushed with pressurized water or mechanically cleaned. To avoid this, the calcining plant must be capable of being immediately adjusted down to its lowest capacity, in order to bridge the standstill period with the available sludge supplies.

Conversely, after the stoppage or towards the end of the sugar campaign, the plant must run at an even higher capacity than that for which it is nominally designed, in order to process the remaining available sludge as quickly as possible so that the sugar factory can be finally shut down.

In short, for optimum effectiveness, a calcining plant associated with a sugar making operation must be able to run both on a small partial load and on an overload as well as at nominal design capacity.

The main factor in achieving this goal is the reactor of the calcining plant. The proper functioning of this component depends on a correctly regulated course of flow of the process fluid with an upwardly tending throughput flow close to the walls of the reaction chamber and a central return flow running from the top to the bottom of the chamber and carrying additional fuel and the raw product into the reaction chamber. The correct regulation of this return flow is especially critical, and it plays a decisive role in determining how much the load on the entire plant can be regulated upwards and downwards.

As the load (and throughput of process fluid) is reduced, the local flow forces (dynamic pressure,. etc.) sink with the square of the throughput. One accordingly approaches a point at which the downwardly moving return flow is no longer able to overcome the ascending current. The return flow therefore has to be made strong enough to carry additional fuel and raw product far enough downwards into the reaction chamber for the latter to operate properly.

If, on the other hand, the throughput is increased beyond the nominal value, the local current forces likewise increase with the square of the throughput. This becomes critical in that entry spiral area at the bottom of the reaction chamber where the process fluid is introduced and where the return current is retarded, turns radially outwards, and ascends with the newly entering hot gas. During this deflection process, the particulate solids carried by the return current are subject to a strong centrifugal force. If a certain limit in the speed of the return current, and therefore a particular limit of centrifugal force, is exceeded, the particles are in danger of being ejected from the return current.

It is the basic intention to carry oversize pieces, impurities, etc. out of the reaction chamber and to protect the subsequent process from these impurities. If, however, the centrifugal forces exceed a certain limit, which is known to be dependent on the particle size and the flow conditions, not only the relatively few impurities present, but also to an increasing extent the coarser grain fraction of the CaO, will be flung out in the deflection area of the return flow. This leads very quickly to considerable deposits of more-than-less calcined CaO on the bottom of the reaction chamber and in the center of the vortex created by the gases introduced into the reaction chamber through the input spiral. For this reason, the return flow must not exceed certain critical upper limits even when the capacity is increased.

I have discovered certain parameters which make it possible to design a reaction chamber capable of fulfilling both contradictory requirements; attainment of a strong return flow at the lower limit of capacity and avoiding too strong a return flow at the upper limit of capacity. In particular I have observed that the radial distance and area occupied by the return flow in the region of the entry spiral as it is deflected outwards varies with the throughput of the process fluid, spreading out as the throughput is increased. This means that a greater cross-section is available for the deflection of the return flow, so that smaller centrifugal forces occur. This is a selfregulating effect, which thus makes it possible to achieve useful results over a surprisingly wide range of operating capacities. The parameters or prerequisites necessary to providing a wide range of operating capacities are adequate room for the deflection of the return current in the entry spiral and a coordinated flow producing force on the return current. The latter is determined by the vertical distance travelled by the return current and by the rise of static pressure from the bottom to the top of the reaction chamber as a result of the conical widening of the chamber.

From the foregoing it will be apparent that an additional primary object of the present invention is the provision of novel, improved apparatus commensurate with the preceding objects which has the capability of operating over a wide load range.

A related and also primary object of my invention resides in the provision of novel reactors for giving apparatus as described in the preceding object the capability referred to therein.

Further novel features and other important objects and advantages of this invention will become apparent from the following detailed description, discussion and the appended claims taken in conjunction with the accompanying drawings which disclose an installation for carrying out the process according to the invention for the recovery of lime from predried lime-containing waste sludges. In the drawing:

Figures 1, 2, 3:
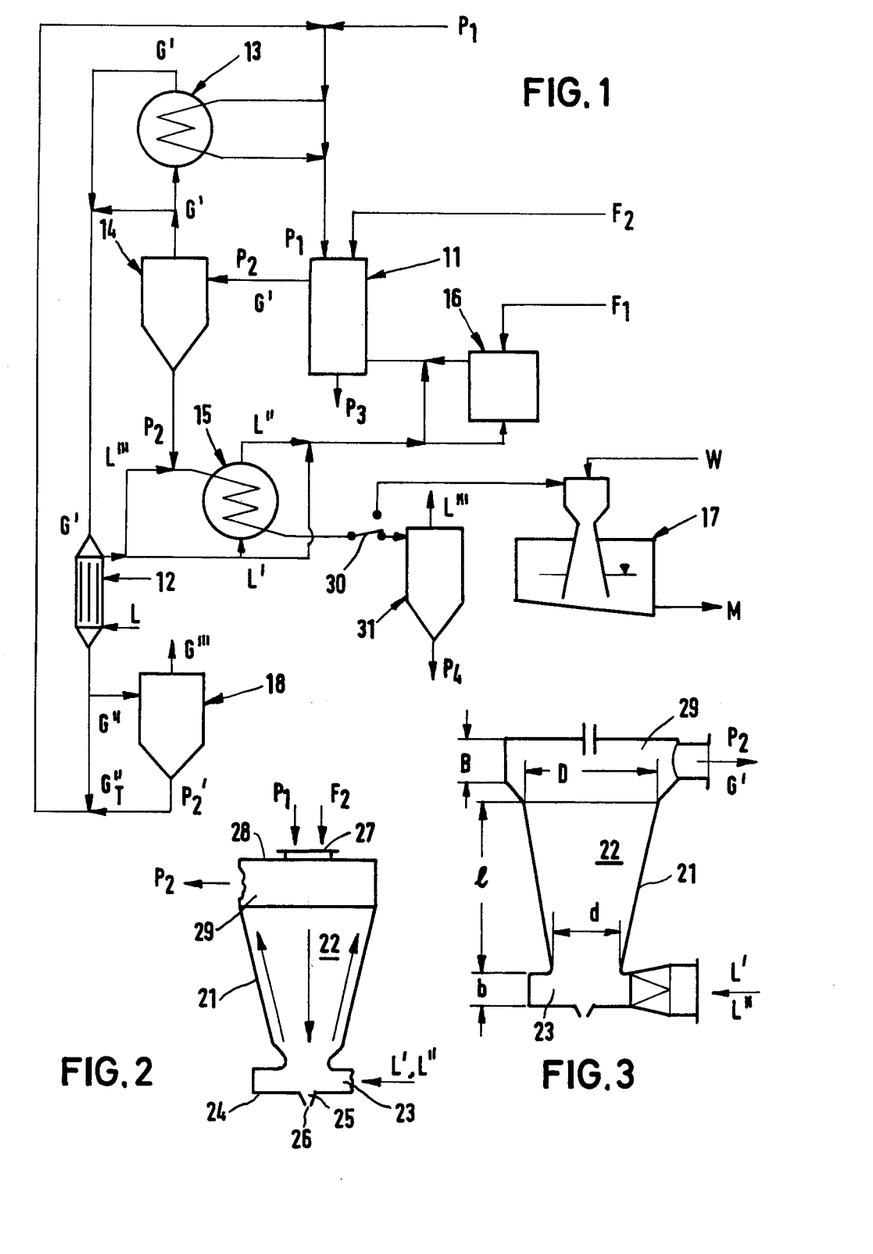
FIG. 1 shows a diagrammatic general view of an installation in accord with the principles of the present invention from which the individual parts of the installation and the way they cooperate with one another may be seen.
FIG. 2 shows a cross-section through a particularly advantageous construction of a heat treatment chamber for the installation according to FIG. 1.
FIG. 3 shows a simplified view of the heat treatment chamber with dimensional designations.

FIG. 1 shows an installation for carrying out the process for the production of lime according to the invention which comprises substantially an upright heat treatment chamber (calcining chamber) 11 (see chamber 22 in FIGS. 2 and 3), a preheater for the combustion air 12, a raw material preheater 13 for the starting material or raw material $P_1$ to be treated in the chamber 13, a dust separator 14 and if necessary a further air preheater 15, and also a combustion chamber 16 for an additional temperature increase for the combustion air.

Also selectively connected to the installation by way of a change-over device 30 is the lime milk production installation 17 or a cyclone separator 31.

The combustion air L is heated to a specific temperature by means of the air preheater 12, a heat exchanger. For this purpose exhaust gases G' discharged from the dust separator 14 flow through the air preheater 12. The preheated combustion air L' can be supplied either directly or after passing through a further air preheater 15 for further heating to the heat treatment chamber 11. The further heat exchanger 15, used for air preheating, is supplied with the more or less agglomerated, hot lime powder $P_2$ which has been separated in the dust separator 14 from the carrier gas G', and which gives up its heat content as far as possible to the combustion air L' in the heat exchanger 15. If necessary the combustion air L' which has been preheated once or air L'' preheated twice can be further heated in the combustion chamber 16 by burning a fuel $F_1$ introduced into the chamber.

The hot combustion air is then supplied to the lower end of the upright treatment chamber 11 and temporarily holds in suspension the raw material to be treated which is introduced from above into the chamber 11, while the calcining process takes place. Also introduced into the chamber 11 is additional fuel $F_2$ for maintaining specific operating conditions in the chamber. The raw material $P_1$ to be treated which is introduced into the chamber is preheated from the dust separator. If the raw material $P_1$ has already been preheated elsewhere to a sufficiently high temperature, it can be introduced directly into the chamber 11 without having to pass through the preheater 13.

Situated at the bottom of the chamber 11 is an outlet for large lime particles $P_3$ which cannot be carried by the upward flow of gas in the chamber 11 and therefore sink to the bottom.

The lime powder $P_2$ discharged from the dust separator 14 is introduced, after cooling if necessary in the heat exchanger 15, to the lime milk production apparatus 17 in which it is mixed with a measured quantity of water W. The lime milk M which is produced is then fed to the sugar production installation. The same happens with the discharged gas which contains $CO_2$, which is required for sugar production.

Instead of being supplied to the lime milk production apparatus 17, the cooled agglomerates $P_4$ may also be separated from the protective gas L''' in a conventional separator 31 and discharged from the installtion in solid form, for example for building purposes.

The cooled gases G'' issuing from the heat exchanger 12 must usually also be purified in a fine dust separator 18. The residual dust $P'_2$ separated therein is fed together with a carrier gas flow $G''_T$ branched from the gas flow G'' and raw material $P_1$ fed into it into the heat exchanger 13 and the chamber 11. The purified gas flow G''' is then supplied to the sugar production installation where its $CO_2$ content is required.

If heat given off at calcining is required for evaporation of a possible moisture content in the lime sludge, the heat exchangers situated downstream of the dust separator 14 can be wholly or partly replaced by drying apparatus of known type into which the calcining exhaust gases are introduced directly.

In the heat treatment chamber 11 the calcining of the $CaCO_3$ introduced with the preheated lime sludge is carried out, the lime particles being held in suspension in the upwardly directed gas flow of the hot combustion air for a more or less long time, but in general only briefly.

The lime particles introduced into and mixed with the air flow are so carried by the gas flow that the relatively small particles achieve only a short time of residence in the chamber whereas the larger particles owing to the higher speed at which they descend in the gas flow are carried upwards more slowly than the smaller particles. As a result there is obtained necessarily, and in a desirable manner, a longer period of residence for the relatively large particles which, however, do require a somewhat longer time in order to obtain complete calcining. At the upper end of the chamber the hot reaction gas and the fulling reacted lime particles then issue from the reaction zone, to be introduced into the downstream dust separator. In the interests of optimum procedure, to obtain a uniform and high-quality product, it is important that the mixing of the raw material (starting material) with the flow of combustion air in the heat treatment chamber 11 should take place uniformly and without dividing into several flow lines, so that the particles are never over-heated and there is no lack of air at any region in the chamber, so that combustion of the introduced combustible substances would be incomplete and residues would remain.

In order to solve this problem in a particularly simple and advantageous manner, an upright chamber is used in which a vertically downwardly directed central flow is provided into which the raw material is introduced whereas in the peripheral region of the chamber an upwardly directed flow is present. The downwardly directed central flow is deflected in the lower region of the chamber and introduced into the upwardly directed flow. The additional fuel which may be necessary is introduced like the raw material into the downwardly directed central flow.

FIG. 2 shows a constructional example for an apparatus to be used as the calcining chamber 11 in which it is possible to produce a flow system particularly suitable for carrying out the process. It comprises a rotationally symmetrical, vertically arranged container 21 comprising the chamber 22 into which the heated combustion air L' and L'' is introduced by way of an inlet guide device, for example an inlet spiral 23, an equivalent bladed or vaned inlet system or a tangential inlet. As a result a spinning effect is imparted to the combustion air allowing it to flow upwards with a certain peripheral component along the chamber walls. At the same time owing to the rotation of the combustion air a negative pressure is produced in the center of the inlet cross-section which forces some of the combustion air arriving at the upper end of the chamber to turn inwards and flow along the chamber axis downwards to approximately the inlet cross-section. Reference may be made to U.S. Pat. No. 2,935,840 for details of the basic flow principles of this kind of mixing chamber.

In this way it is possible to achieve the desired object of uniform distribution of the raw material $P_1$ over the quantity of air L', L'' since the negative pressure in the center of the inlet guide device 23 centers the downwardly moving central flow. This avoids a unilateral distribution of the raw material $P_1$ which would result in flow strands. Furthermore, the effect is achieved that by the rotation of the combustion air the particles of raw material $P_1$ from the downwardly directed central flow are brought slowly upwards by centrifugal force and thus into the upward flow. Only the coarse particles which are too heavy for this purpose fall downwards on the bottom 24 or into the collecting hopper 25 from which they are discharged from time to time ($P_3$) by a discharge apperture 26.

The chamber 22 is in the form of a truncated cone which can widen uniformly upwards or, as illustrated, first of all relatively strongly and then to a less considerable extent. The housing wall surrounding the chamber can be bulged outwards to a greater or lesser extent if desired. Experience shows that a purely conical shape with possibly an additional constriction at the lower inlet cross-section gives the best operating results, since in this way a high speed along the wall is obtained which counteracts material being deposited on the wall. If relatively considerable outward bulges are provided the speeds drop in accordance with the increase in cross-section and the risk of solids becoming deposited on the wall is increased.

Tests have shown that mixing of the constituents introduced into the apparatus is particularly intensive if the following dimensioned relationships are observed as FIG. 3 shows:

$D/b = 1.5 \ldots 3$, preferably $1.8 \ldots 2.5$
$l/d = 3 \ldots 4.5$
$b/d = 0.5 \ldots 0.7$
$B/d = 1 \ldots 2$, the angle of the inlet spiral 23 relatively to the peripheral direction being between 5° and 15°, preferably between 7° and 12°.

As previous investigations have shown, this flow pattern is not dependent on the Reynolds number, that is to say does not depend on dimension, speed or temperature of components. This means that extremely simple model laws apply here; observing the ratios given hereinbefore, the dimensions can be increased or reduced in a simple and proportionate manner, whereby the throughputs are varied with the cross-sections and therefore with the square of the dimensions.

The flow speeds are to be so selected in each case that they are sufficient at least for discharging the fine-particle products produced. The heat balance gives the gas quantities and thus the flow cross-section.

In accordance with the known rules of the spinning principle, the small diameter d can be reduced at about 40% if at the same time the width b of the inlet spiral 23 is increased by the same amount, and vice versa. The peripheral speeds in the inlet spiral 23 and the negative pressure at its center remain approximately unaltered.

If there is a risk of accretions, the dimensions can be increased to a considerable extent in the lower region of the reaction chamber and less considerably in the upper region so that a bellied shape is obtained instead of a conical shape.

The raw material $P_1$ and the additional fuel $F_2$ are introduced from above through a central aperture 27 in the upper cover 28. For this purpose it is possible for example to provide a conveying device which is not shown here, for example a feed screw. Advantageously the raw material $P_1$ is transported by a flow of carrier gas. This has the advantage that the flow of carrier gas can transport the raw material $P_1$ more easily through the preheater and then introduce it from above vertically downwards and centrally into the return flow in the chamber 22. The additional fuel $F_1$ is also introduced vertically from above into the said return flow, for example through a gas supply pipe or by means of an atomizing nozzle for fuel oil.

In the chamber 22 there is formed between the upward flow near the wall and the central downward flow a vortex zone in which thorough mixing of raw material, additional fuel, air and produced combustion gas is brought about. Since in this zone there is an axial speed of nil as a mean value for the upward throughput flow and the central return flow, it is used at the same time for flame stabilization.

The calcined lime particles forming the finished product $P_2$ issue from the chamber 22 together with the exhaust gas through a radial or tangential outlet 29 to be introduced into the dust separator 14.

In the calcining of $CaCO_3$ there is a risk that the $CaO$ will combine again on cooling with the $CO_2$ from the exhaust gas containing $CO_2$ to form $CaCO_3$. In order to avoid this, the $CaO$ obtained is separated from the hot exhaust gas $G'$ while there is still a sufficiently high temperature in the separator 14.

In order to bring about the desired rapid calcining of $CaCO_3$ and also ignition of the organic constituents or the additional fuel $F_2$ on first contact with the preheated quantity of air $L'$, $L''$, it is advantageous to heat the combustion air to at least the calcining temperature, that is to say about 860° C., but advantageously higher, in order to have a sufficient temperature gradient available for igniting the combustible material and for initiating calcining. According to the invention, temperatures of between 1000° C. and 1400° C. are to be selected.

The upper temperature limit is given by the condition that the always fluctuating constituents of the combustible substances require a certain air surplus, and the ratio of air supply relative to the theoretical quantity of air for combustion should be adjusted to at least 1.20, preferably 1.40 to 1.60.

In order that with a view to having a small and inexpensive apparatus the $CaO$ can be made sufficiently ready to react chemically and physically for the following lime milk production, according to the invention, it is important to keep the times of residence in the combustion zone short and to keep the speed of heating high. The time of residence is not to exceed one second, and the heating speed is to amount to at least 400° per second. As already mentioned, these conditions have to be observed if in the separation of the burnt lime from the hot gas flow an adequate degree of separation is to be obtained with economically acceptable means.

For this purpose, the preheating of the raw material $P_1$ according to the invention can only be taken so far that the organic combustible constituents in the raw material $P_1$ are not yet ignited, or thermally cracked to any considerable extent. Depending on the compositon of the organic constituents in the raw material $P_1$, the preheating thereof must not exceed a specific temperature, more particularly a temperature of 800° C., and is preferably to be between 450° C. and 600° C. Only if few or no organic constituents are present in the raw material $P_1$, can the preheating be taken up to the upper limit of 800° C. which is possible according to the present process. The possible preheating temperature is obtained in known manner from the thermal balance of the entire process and depends on how much waste heat is required for drying the sludge.

It is preferable to use as the carrier gas for the raw material $P_1$ a portion of the exhaust gas flow in order to use its available heat content also in this way.

The temperature of the hot gases and therefore approximately also of the finished product $P_2$ on entering the separating apparatus 14, e.g. a dust separator, is, to avoid a recombination of CaO with $CO_2$, to be a certain safety amount above the equilibrium temperature of $CO_2$ cracking at the relevant $CO_2$ content of the exhaust gases. At atmospheric pressure this is about 860° C. Therefore, advantageous temperature values are 900° C. to 950° C. As a result the pre-heating ability of the raw materials $P_1$ is limited to about 800° C. to 850° C., if the organic constituents content or the heat required for sludge drying do not, as mentioned hereinbefore, require a lower limit.

If the raw material $P_1$ does not contain any organic constituents, a corresponding quantity of additional fuel $F_2$ must be introduced into the chamber 22. The fuel can be in the form of fine particles, in the form of a gas or an atomized liquid. This is particularly true if the installation for the sugar lime sludge has first of all to be operated for a certain amount of time with ground limestone at the beginning of operations until the first sugar lime sludge is produced from the sugar production process, or if the installation is to be operated outside the sugar campaign for conventional lime production.

Figure 4:
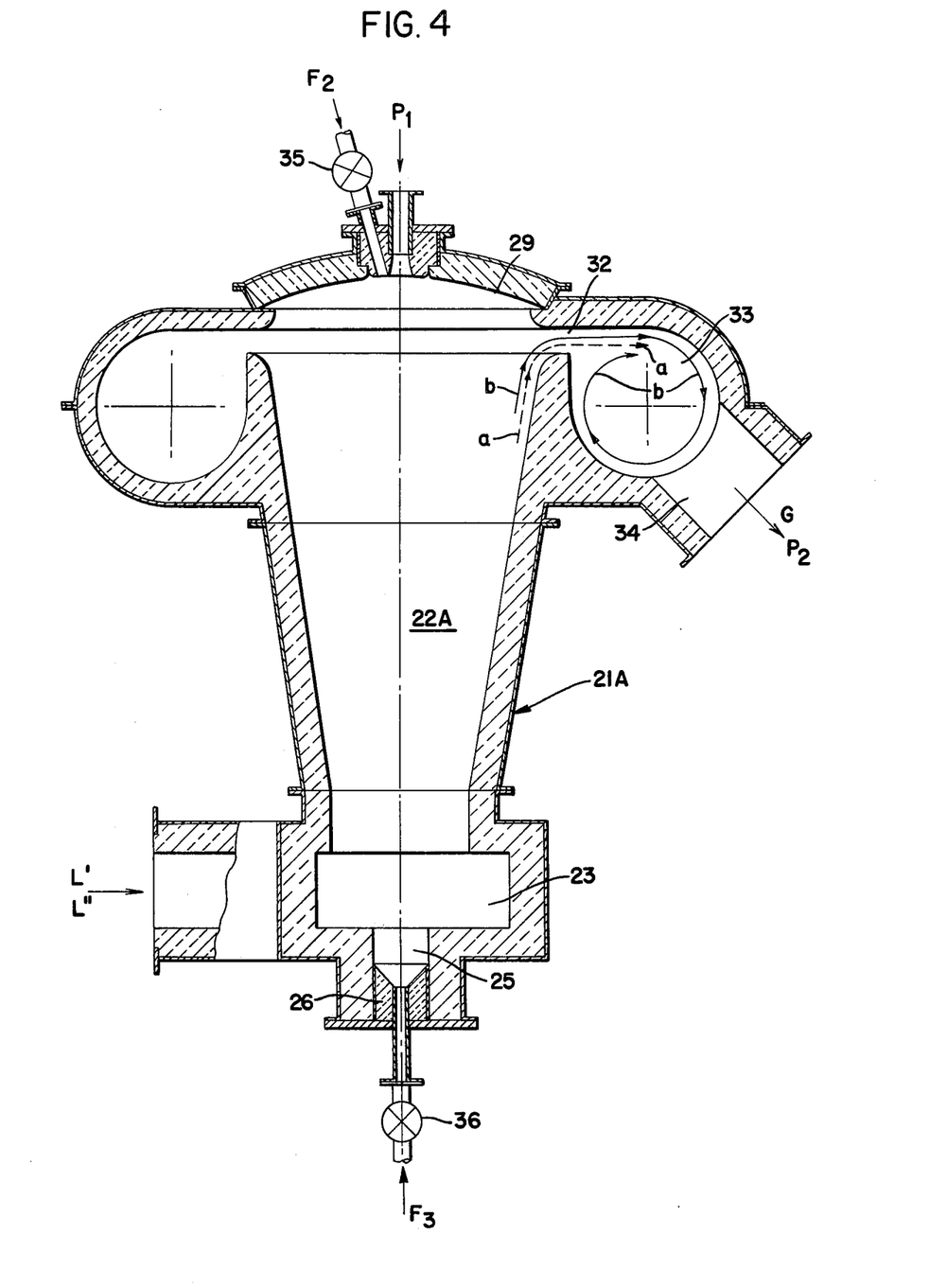
FIG. 4 is a vertical section through a second form of heat treatment chamber in accord with the principles of the present invention and intended for use in installations of the type shown in FIG. 1.

Referring still to the drawing, FIG. 4 depicts a reactor 21A embodying the principles of the present invention and designed to minimize the consumption of excess air, thereby increasing efficiency, and to furnish control over physical characteristics of the calcined particles produced in the reactor.

Reactor 21A differs from the reactor 21 discussed earlier herein and illustrated in FIG. 2 in that the upper or outlet end 29 of its reaction chamber 22A is a slot 32 which extends around the periphery of the reactor and is connected in a tangential flow relationship to an annular chamber 33 which surrounds the slot with its axis of symmetry coincident with the vertical axis of reaction chamber 11A. Chamber 33 has a vertically oriented, toroidal cross-section.

Dotted line "a" in FIG. 4 shows how the gases in the boundary layer adjacent the wall of reactor 21A flow through annular exit slot 32 into chamber 33. As shown by solid line "b", additional gases flow from regions nearer the center of the reaction chamber through slot 32 and rotate in a vertical circular pattern in chamber 33. These gases envelop the gases identified by arrow "a" so that the latter are mixed with the other gases and the solids flowing into chamber 33 and therefore enter into the calcining reaction. This reduces the amount of excess air from what would be required if, as is the case in other designs, the boundary layer air did not enter into the process to any significant extent.

The cross-sectional dimensions of ring slot 32 are also of importance. These should be so selected that the pressure head on the hot gases in the ring slot is about 10% of the whole pressure loss across the reaction chamber, making the pressure head on the hot gases in the range of 10–50 mm WG.

The calcined product $P_2$ and the exhaust gas G leave the chamber 33 through one or more outlet apertures 34.

The reactor 21A shown in FIG. 4 also has an additional fuel inlet $F_3$ for introducing fuel upwardly into the inlet device 23 of the reaction chamber. The two fuel inputs $F_2$ and $F_3$ allow the fuel to be introduced either more toward the center or more toward the outer zones of the reaction chamber and thus allow the temperature profile in the reaction chamber to be controlled as desired, thereby influencing physical properties of the calcined product such as hardness and abrasiveness.

The flow through the fuel inputs can be regulated as by valves shown schematically in FIG. 4 and identified by reference characters 35 and 36.

Figure 5:
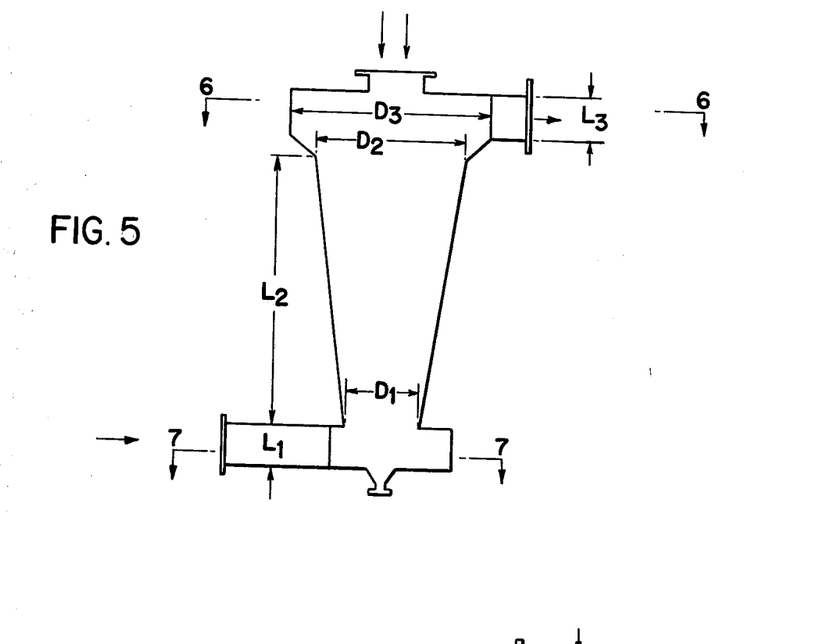
FIG. 5 is a schematic vertical section through a reactor embodying the principles of the present invention and designed to operate over a wide load range.
Figure 6:
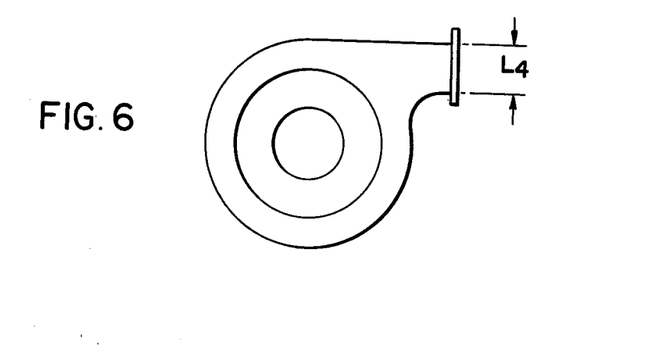
FIGS. 6 and 7 are sections through the reactor of FIG. 5 respectively taken substantially along lines 6—6 and 7—7 of FIG. 5.
Figure 7:
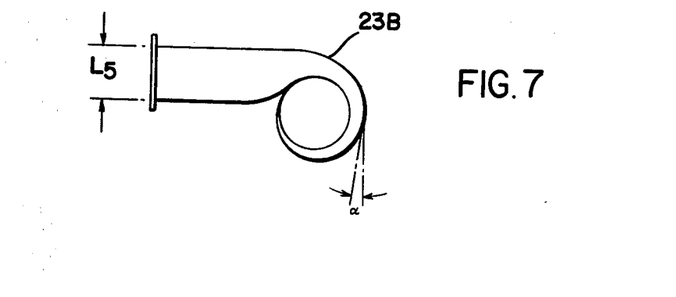

It was pointed out above that reactors in accord with the principles of the present invention can be given the capability of operating efficiently under conditions involving loads significantly higher and lower than the nominal design load by maintaining certain dimensions of the reactor and reaction chamber within specified limits. These dimensions are shown in FIGS. 5–7 in which the reactor is identified by reference character 21B and the reaction chamber by reference character 22B.

For a throughput of 350,000 m³/hour of hot gas at 1300° C. and with a pressure drop in the reaction chamber of p=600 mm WG (corresponding to a production of about 300 tons per day CaO or an input of about 1100–1200 tons per day of carbonatation sludge) the following dimensions may be employed.

$l_1$ = 950 mm
$l_2$ = 5700 mm
$l_3$ = 1000 mm
$l_4$ = 1000 mm
$l_5$ = 1600 mm
$d_1$ = 1600 mm $\phi$
$d_2$ = 3200 mm $\phi$
$d_3$ = 4100 mm $\phi$
$\alpha$ = approx. 8°

With the foregoing dimensions, the throughput can be adjusted down as far as a pressure drop in the reaction chamber of $\Delta P$ = 50–60 mm WG, corresponding to a hot gas throughput of 100,000 m³/hour at 1300° C., and can be adjusted up as far as a pressure drop of about 800 mm WG, corresponding to a hot gas throughput of 400,000 m³/hour at 1300° C.

At the lower limit of capacity, the sludge throughput can be adjusted down still further by reducing the additional fuel introduced into the return current and/or by lowering the entry temperature of the hot gas. Here, there is a clearly defined reaction chamber temperature limit of 880°–900° C. Below this limit, the reaction will not proceed.

Since, with the exception of those phenomena in the center of the entry spiral described above, the current pattern in the reaction chamber does not depend on the Reynolds number, the simple laws of flow pattern with approximately constant friction and loss factors are applicable. Therefore, for other throughputs, the dimensions listed above can be varied in proportion to the square root of the throughput ratio. If it is desired to operate the apparatus at a given throughput with other pressure drops, the dimensions must be varied in inverse proportion to the biquadratic root of the ratio of the pressure drops.

It is important that the given dimensions be maintained with an exactitude of ±5%, except for the dimensions $L_3$ and $L_4$ of the outlet diameter. These dimensions are not critical. Also, too great an outlet diameter merely has the effect that CaO is deposited until, in the remaining free diameter, adequate flow rates for the removal of the CaO are reached.

Furthermore, a proportional increase of $D_1$ can be offset by a corresponding decrease of $L_1$, so that the product of the two values remains constant. It is possible to vary each of these individual values by a factor of about 1.4 to 1.5.

The angle α between the entry spiral and a tangent to the reactor can range between 6° and approx. 12°–13°. The best spiral angles are those between 8° and 11°.

With otherwise constant conditions, the vacuum in the center of the entry spiral and thus the impulse of the return current can be strengthened by reducing diameter $D_1$ by at most, from 1.3 to 1.4. This reduction of the diameter $D_1$ within the given limits is useful when the combustion of the organic components in the carbonatation sludge, and if necessary of the additional fuel, is to be carried out with a particularly small air ratio. However, depending upon the sludge properties, especially the loam content, too great a decrease in the diameter $D_1$ can result in deposits in the lower area of the walls of the reaction chamber.

The measures described above are equally effective in the start-up period of sugar manufacture when no carbonatation sludge is yet available and the required CaO is obtained from ground limestone; in the transitional period, when sludge and limestone are used together; and for the calcination of other calcinable substances in the same plant.

With the above-discussed dimensions, the reaction chamber proved to be insensitive to the unavoidable roughnesses and unroundnesses of the refractory brick walling. Attention must be paid, however, to an even and strand-free influx of the hot gases into the entry spiral so that a rotationally symmetrical flow pattern in the reaction chamber can be obtained. To achieve the sufficiently low rates necessary to maintain homogenity, one can use with a height $L_1=950$ mm of the entry spiral, an entry channel width of $L_5=1600$ mm.

Those dimensions which are important to the successful operation of the reactor over a wide load range can be mathematically expressed and related as follows:

$L_1 = 950 \, (X/Y)$ mm,
$L_2 = 5700 \, X$ mm
$D_1 = 1600 \, Xy$ mm, and
$D_2 = 3300 \, X$ mm, where:

$L_1$ is the vertical dimension of the means through which the gas is introduced into the reactor;
$L_2$ is the height of the conically sectioned portion of the reactor;
$D_3$ is the diameter of the reactor at the lower end of the conically sectioned portion thereof;
$D_4$ is the diameter of the reactor at the upper end of the conically sectioned portion thereof;
$y$ is in the range of 1 to 1.5; and $$X = (1 \pm 0.05)\sqrt{\frac{R_T}{3.5 \times 10^5}} \sqrt[4]{\frac{600}{\Delta P}} \text{ ; where}$$

$R_T$ = the throughput of heated gas in m³/hour at 1300° C.; and
$\Delta P$ is the pressure drop across the conically sectioned portion of the reactor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Calcining apparatus which comprises:
   a. a reactor;
   b. means for introducing a particular raw material to be calcined into said reactor;
   c. means for introducing a heated gas into the reactor and for effecting a flow of said gas through said reactor to convey the raw material through the reactor and to calcine said material;
   d. an outlet for the calcined material and the gas by which the calcined material is conveyed through the reactor;
   e. means for separating from the calcined particles the gas removed from the reactor therewith and for replacing said gas with one which is essentially chemically inert with respect to the calcined particles;
   f. an unfired preheater for the raw material; and
   g. means for circulating the gas from which the particles were removed through said preheater in heat transfer relationship with said raw material.

2. A reactor for processing particulate materials comprising:
   a. an elongated casing which is essentially symmetrical with respect to a vertical axis and diverges between the lower and upper ends thereof;
   b. means for introducing the particulate material to be processed downwardly into said reactor at the upper end and in the center thereof;
   c. means for introducing a gas into said casing at the lower end thereof and for imparting to the gas as it is introduced a motion which is rotary relative to the axis of the elongation of said casing; and
   d. a horizontal tangential outlet at the upper end of said casing;
   e. whereby the particles introduced into the upper end of said reactor will migrate downwardly therethrough and will then be deflected toward the casing and entrained in an upward flow of the gas introduced into the lower end of the reactor and carried upwardly therethrough and discharged through said outlet;
   f. said casing having an inverted frustoconical configuration,
      $D/d$ being 1.5 to 3,
      $l/d$ being 3 to 4.5,
      $b/d$ being 0.5 to 0.7, and
      $B/d$ being 1 to 2
   where:
      D is the largest diameter of the frustoconical casing section,
      d is the smallest diameter of the section, and
      b and B are the vertical dimensions of, respectively, the means for introducing the gas into the reactor and the means through which the particles can exit therefrom; and
   g. the means for introducing gas into the reactor being so disposed relative to the casing that the angle between the path followed by the gas and a line tangent to the casing is between 5° and 15°.

3. A reactor for processing particulate materials comprising:

a. an elongated casing which is essentially symmetrical with respect to a vertical axis and diverges between the lower and upper ends thereof;
b. means for introducing the particulate material to be processed downwardly into said reactor at the upper end and in the center thereof;
c. means for introducing a gas into said casing at the lower end thereof and for imparting to the gas as it is introduced a motion which is rotary relative to the axis of the elongation of said casing; and
d. a horizontal tangential outlet at the upper end of said casing;
e. whereby the particles introduced into the upper end of said reactor will migrate downwardly therethrough and will then be deflected toward the casing and entrained in an upward flow of the gas introduced into the lower end of the reactor and carried upwardly therethrough and discharged through said outlet;
f. said casing having an inverted frustoconical configuration,
   D/d being 1.5 to 3,
   l/d being 3 to 4.5,
   b/d being 0.5 to 0.7, and
   B/d being 1 to 2
where:
   D is the largest diameter of the frustoconical casing section,
   d is the smallest diameter of the section, and
   b and B are the vertical dimensions of, respectively, the means for introducing the gas into the reactor and the means through which the particles can exit therefrom; and
g. the means for introducing gas into the reactor being so disposed relative to the casing that the angle between the path followed by the gas and a line tangent to the casing is between 7° and 12°.

4. A reactor for processing particulate solids comprising:
a. a vertically elongated casing;
b. means for introducing a particulate solid to be processed into the upper end of said casing;
c. means for so introducing a process gas into, and effecting the movement of gas through, the casing that the gas will spiral upwardly in the regions adjacent the periphery of the casing and will flow downwardly in the central region thereof;
d. whereby the particles introduced into the upper end of the casing will flow downwardly through the central region of the casing and be centrifugally deflected into the upwardly moving gas and carried thereby upwardly through the casing, thereby becoming intimately mixed with said gas by virtue of the turbulence existing in the region between, and resulting from the interaction between, the upwardly and downwardly flows of gas;
e. an outlet through which said gas and particulate solids mixed therewith can exit from said chamber; and
f. means at the upper end of said casing for effecting a flow of gas from a border layer adjacent the casing into contact, and mixing it, with the mixture of gas and particulate solids exiting from said chamber to thereby reduce the amount of gas required in the processing of the solids.

5. A reactor as defined in claim 4 in which the means for effecting the flow of gas from the boundary layer comprises a slot through, and extending around the periphery of, said casing at the upper end thereof and a toroidal chamber surrounding and communicating in tangential flow relationship with said slot.

6. A reactor as defined in claim 5 in which the annular slot is so dimensioned that the pressure drop across said slot is on the order of 10 percent of the total head loss of the gas in the reactor.

7. A reactor for calcining particulate solids comprising:
a. a vertically elongated casing;
b. means for introducing the solids to be calcined into the upper end of said casing; and
c. means for effecting the movement of a heated gas spirally upward in the peripheral regions of said casing and downwardly in the central region thereof, whereby the solids introduced into said casing will flow downwardly through the central region of the casing and be centrifugally deflected into the upwardly flowing gas and carried upward through the casing thereby concomitantly becoming intimately mixed with and heated by said gas by virtue of the turbulence existing in the region between, and resulting from, the upward and downward flows of gas;
d. said last-mentioned means comprising means for introducing an oxygen-containing gas horizontally and tangentially into said casing at the lower end thereof and for thereby imparting to said gas as it is introduced a motion which is rotary relative to the axis of elongation of the casing, a first means for introducing fuel into the upper end of the casing, and a second means for effecting a flow of fuel upwardly through the lower end of said casing thereinto and into the central region thereof, whereby the temperature of the gas by which the solids are calcined and conveyed through the reactor is increased by combustion in said reactor.

8. A reactor as defined in claim 7 which has means for varying the amounts of fuel introduced into the upper and lower ends of said casing and thereby controlling the temperature profile in the reactor.

9. A reactor as defined in claim 7 which also has means for effecting a flow of gas from an otherwise stagnant boundary layer adjacent the casing into contact, and mixing it, with the mixture of gas and particulate solids to thereby reduce the amount of gas required to be introduced into the reactor, said means comprising a slot through, and extending around the periphery of, said casing at the upper end thereof and a toroidal chamber surrounding and communicating in tangential flow relationship with said slot.

10. Calcining apparatus which comprises:
a. a reactor;
b. means for introducing a particulate raw material to be calcined into said reactor;
c. means for introducing a heated gas into the reactor and for effecting a flow of said gas through said reactor to convey the raw material through the reactor and to calcine said materials, said means comprising an inlet at the lower end of said reactor;
d. an outlet for the calcined material and the gas by which the calcined material is conveyed through the reactor, said outlet means being located at the upper end of said reactor;
e. said reactor having a conically sectioned portion extending upwardly from said inlet to said outlet; and
f. said reactor having the following dimensions:

$L_1 = 950 (X/y)$ mm,
$L_2 = 5700$ X mm
$D_1 = 1600$ Xy mm, and
$D_2 = 3300$ X mm,
where:
$L_1$ is the vertical dimension of the means through which the gas is introduced into the reactor;
$L_2$ is the height of the conically sectioned portion of the reactor;
$D_1$ is the diameter of the reactor at the lower end of the conically sectioned portion thereof;
$D_2$ is the diameter of the reactor at the upper end of the conically sectioned portion thereof;
y is in the range of 1 to 1.5; and $$X = (1 \pm 0.05) \cdot \sqrt{\frac{R_T}{3.5 \times 10^5}} \sqrt[4]{\frac{600}{\Delta P}}, \text{ where}$$

$R_T$ = the throughput of heated gas in m³/hour at 1300° C.; and
$\Delta P$ is the pressure drop across the conically sectioned portion of the reactor.

11. Calcining apparatus as defined in claim 10, in which the width of the inlet at the lower end of the reactor is 1600 X mm where X is as aforesaid.

12. Calcining apparatus as defined in claim 10, in which the reactor has a diverging upper portion above the conically sectioned portion thereof, said upper portion having a maximum diameter of 4100 X mm; the outlet for said calcined material and gas being tangential to the inner periphery of said upper portion and having a cross-section of 1000 by 1000 X mm; and X in each instance being as aforesaid.

13. Calcining apparatus as defined in claim 10, in which the axial centerline of said fluid inlet intersects a line tangent to the conically sectioned reactor portion at an angle of from 6 to 12 degrees.

14. Calcining apparatus as defined in claim 10, in which $1 \leq y \geq 1.4$.

15. A reactor for use in calcining apparatus and the like and for other purposes which has:
 a. a fluid inlet at the lower end thereof;
 b. means by which a material to be processed can be introduced into said reactor;
 c. a conically sectioned portion in which said material can be processed by fluid introduced through said inlet, said conically sectioned portion extending upwardly from a location generally coincident with the upper end of said inlet; and
 d. an outlet for processed material and fluid, said outlet being at the upper end of the conically sectioned portion of the reactor;
 e. said reactor having the following dimensions:
 $L_1 = 950$ X mm
 $L_2 = 5700$ X mm,
 $D_1 = 1600$ Xy mm, and
 $D_2 = 3300$ X mm,
where:
$L_1$ is the vertical dimension of the fluid inlet;
$L_2$ is the height of the conically sectioned portion of the reactor;
$D_1$ is the diameter of the reactor at the lower end of the conically sectioned portion thereof;
$D_2$ is the diameter of the reactor at the upper end of the conically sectioned portion thereof;
y is in the range of 1 to 1.5; and $$X = (1 \pm 0.05) \cdot \sqrt{\frac{R_T}{3.5 \times 10^5}} \sqrt[4]{\frac{600}{\Delta P}}, \text{ where}$$

$R_T$ = the throughput of heated gas in m³/hour at 1300° C.; and
$\Delta P$ is the pressure drop across the conically sectioned portion of the reactor.

16. A reactor as defined in claim 15, in which the axial centerline of said fluid inlet intersects a line tangent to the conically sectioned reactor portion at an angle of from 6 to 12 degrees.

17. A reactor as defined in claim 15, in which the width of the fluid inlet is 1600 X mm where X is as aforesaid.

18. A reactor as defined in claim 15, which has a diverging upper portion above said conically sectioned portion, said upper portion having a maximum diameter of 4100 X mm; said outlet being tangential to the inner periphery of said upper portion and having a cross-section of 1000 by 1000 mm X; and X in each instance being as aforesaid.

19. A reactor as defined in claim 15, in which $1 > y \leq 1.4$.

* * * * *

UNITED STATES PATENT AND TRADEMARK OFFICE
CERTIFICATE OF CORRECTION

PATENT NO. : 4,201,541

DATED : May 6, 1980

INVENTOR(S) : Fritz Schoppe

It is certified that error appears in the above—identified patent and that said Letters Patent is hereby corrected as shown below:

Column 1, line 31, "line" should read -- lime --.

Column 9, line 29, "D/b" should read -- D/d --.

Column 14, line 8, "particular" should read -- particulate --

Column 18, line 47 should read -- $1 < y \geq 1.4$. ---

Signed and Sealed this

Nineteenth Day of August 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,201,541
DATED : May 6, 1980
INVENTOR(S) : Fritz Schoppe

It is certified that error appears in the above—identified patent and that said Letters Patent is hereby corrected as shown below:

Column 1, line 31, "line" should read --lime--.

Column 9, line 29, "D/b" should read --D/d--.

Column 14, line 8, "particular" should read --particulate--.

Column 18, line 47, should read -- $1 \leq y \geq 1.4$ --.

THIS CERTIFICATE SUPERSEDES CERTIFICATE OF CORRECTION ISSUED August 19, 1980.

Signed and Sealed this

Fourth Day of November 1980

[SEAL]

Attest:

SIDNEY A. DIAMOND

Attesting Officer

Commissioner of Patents and Trademarks